UNITED STATES PATENT OFFICE.

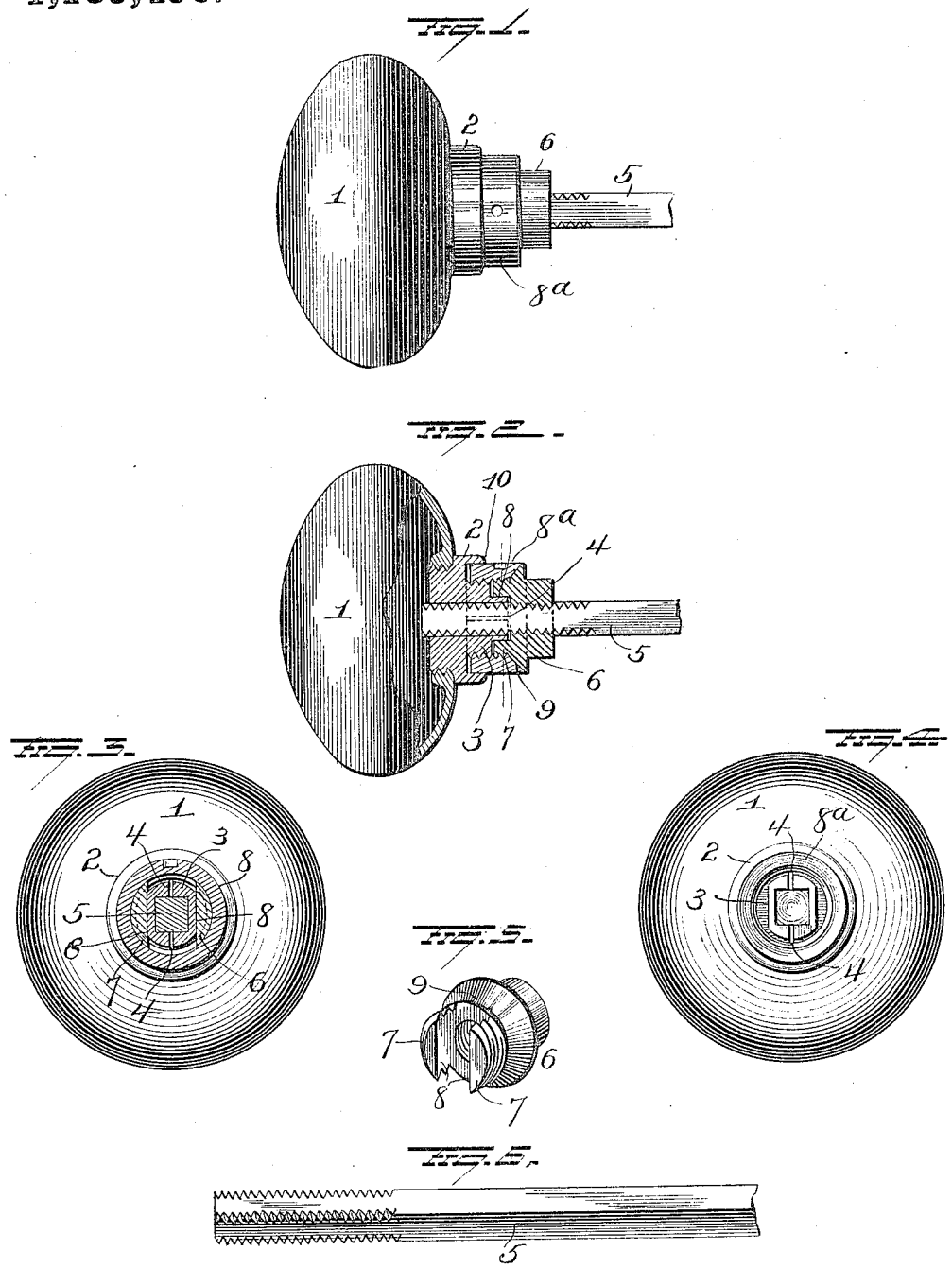

THOMAS E. CROUCH, OF STAMFORD, CONNECTICUT, ASSIGNOR TO THE YALE & TOWNE MANUFACTURING COMPANY, OF STAMFORD, CONNECTICUT.

SCREWLESS KNOB-SHANK.

1,139,496.  Specification of Letters Patent.  Patented May 18, 1915.

Application filed January 12, 1915. Serial No. 1,837.

*To all whom it may concern:*

Be it known that I, THOMAS E. CROUCH, a citizen of the United States, and a resident of Stamford, in the county of Fairfield and State of Connecticut, have invented certain new and useful Improvements in Screwless Knob-Shanks; and I do hereby declare the following to be a full, clear, and exact description of the invention, such as will enable others skilled in the art to which it appertains to make and use the same.

My invention relates to an improvement in door knobs, the object being to provide improved means for securing the knobs to the spindle without the employment of a screw passing through the knob shank and engaging the spindle, and it consists in a knob, the shank of which is reduced at its outer end and made angular in cross section and provided with an angular opening to receive the spindle, a nut screwed onto the spindle and recessed at its outer end to receive the angular outer end of the shank, and a sleeve mounted to turn on the knob shank and threaded internally to engage the nut for locking the latter to the shank.

My invention further consists in certain details of construction as will be more fully explained and pointed out in the claims.

In the accompanying drawings, Figure 1 is a view in elevation of the connected knob and spindle; Fig. 2 is a view in longitudinal section of the same; Fig. 3 is a view in transverse section through the sleeve, nut, shank and spindle; Fig. 4 is a view of the knob; Fig. 5 is a view of the nut, and Fig. 6 is a view of the spindle.

1 represents a knob, having an externally threaded shank 2, the outer or free end of which is cut away at opposite sides so as to provide an angular projection 3.

The shank is provided centrally with an angular opening for the end of the spindle, and is preferably slotted through its long diameter as at 4, to permit it to yield slightly.

The spindle 5 is angular in cross section to conform to the angular opening through the knob shank, and its corners are threaded to receive the nut 6. This nut is threaded internally to engage the threads on the spindle, and is threaded externally at its outer end, or the end which is adjacent the shank of the knob. The threaded end 7 of the nut is recessed as at 8 to receive the angular projection 3 on the knob shank so that when the nut is assembled or in proper position relative to the knob shank, it will turn with the latter, and as the end of the spindle 5 rests within the central opening in the shank, it follows that the spindle will also turn with knob.

8ª is the sleeve, cylindrical in shape, and threaded internally at one end to engage the threads on the knob shank, and also threaded internally at its opposite end to engage the external threads on the nut, the end of the sleeve farthest removed from the knob, being beveled so as to engage and make a closed joint and seat with the beveled rib 9 on the nut 6.

In assembling the parts, the nut 6 is first adjusted, by turning it to proper position on the spindle. The shank of the knob is then passed onto the spindle, and if necessary, the nut should be slightly turned so that its recess 8 will aline with the angular projection 3 on the knob shank, so as to permit the latter to enter the recess, thus locking the knob, spindle, and nut against independent rotary movement. After the parts have been assembled, they are locked against longitudinal separation by turning the sleeve, which engaging the threaded end of the nut, draws the knob inwardly until sleeve is in close contact with the beveled rib 9 on the nut. I prefer to provide the knob with a collar 10 which overhangs the outer end of the sleeve, thus concealing the joint between the sleeve and the knob.

With this construction, the screw usually employed for securing the knob to the spindle is dispensed with, and as the securing means are all concealed by the sleeve it will be impossible for one, not acquainted with the construction, to detach the knob from the spindle.

While I have referred to the projecting end of the shank, the recess in the nut, and the spindle, as being angular, they may be oval or any other shape that will prevent the rotation of one part on or within another part, hence by the term angular I intend to include any shape or construction that will prevent the connected parts from turning or rotating independently of each other.

It is evident that many slight changes might be resorted to in the relative arrangement of parts shown and described without departing from the spirit and scope of my invention. Hence I would have it understood that I do not wish to confine myself to the exact construction and arrangement of parts shown and described but Having fully described my invention what I claim as new and desire to secure by Letters-Patent, is:—

1. The combination of a door knob the shank of which is constructed to receive an end of the spindle, the free end of said shank being angular in cross section, a spindle, a nut having threaded engagement with the spindle and provided with an angular recess to receive the angular end of the shank, and a sleeve mounted to turn on the knob shank and threaded internally to engage the nut.

2. The combination of a door knob the shank of which is constructed to receive an end of the spindle, the free end of said shank being angular in cross section, a spindle, a nut having threaded engagement with the spindle and provided with a recess to receive the angular end of the shank, and a sleeve having threaded engagement with the knob shank and also with the nut.

3. The combination of a door knob the shank of which is constructed to receive an end of a spindle, the free end of said shank being angular in cross section and slotted, a spindle, a nut having threaded engagement with said spindle and provided with a recess to receive the angular end of the shank and a sleeve mounted to turn on the shank and internally threaded to engage external threads on the nut.

4. The combination of a door knob the shank of which is provided with an opening to receive an end of the knob spindle, the free end of said shank being angular in cross section, a spindle, a nut having threaded engagement with the spindle and provided externally with a peripheral rib, and at its outer end with a recess to receive the angular end of the shank, and a sleeve mounted to turn on the shank and internally threaded to engage external threads on the nut.

In testimony whereof, I have signed this specification in the presence of two subscribing witnesses.

THOMAS E. CROUCH.

Witnesses:
SCHUYLER MERRITT,
WILLIAM P. MOSELY.

Copies of this patent may be obtained for five cents each, by addressing the "Commissioner of Patents, Washington, D. C."